United States Patent [19]

Mizunuma et al.

[11] 3,856,540

[45] Dec. 24, 1974

[54] CEMENT ADDITIVE

[75] Inventors: Tsutomu Mizunuma; Takeo Yoshida, both of Ohmi, Japan

[73] Assignee: Denki Kagaku Kogyo Kabushiki Kaisha, Tokyo, Japan

[22] Filed: Jan. 26, 1973

[21] Appl. No.: 327,556

[30] Foreign Application Priority Data
Jan. 28, 1972    Japan.................................. 47-10312

[52] U.S. Cl................................... 106/89, 106/314
[51] Int. Cl.............................................. C04b 7/02
[58] Field of Search...................... 106/89, 314, 315

[56] References Cited
UNITED STATES PATENTS

| | | | |
|---|---|---|---|
| 1,904,640 | 4/1933 | Windbecker..................... | 106/100 X |
| 3,628,973 | 12/1971 | Greening............................... | 106/89 |

*Primary Examiner*—Delbert E. Gantz
*Assistant Examiner*—John P. Sheehan
*Attorney, Agent, or Firm*—Sughrue, Rothwell, Mion, Zinn & Macpeak

[57]    ABSTRACT

A cement additive consisting of calcium sulfate and calcium fluoroaluminate having the chemical formula $3CaO \cdot 3Al_2O_3 \cdot CaF_2$.

2 Claims, 1 Drawing Figure

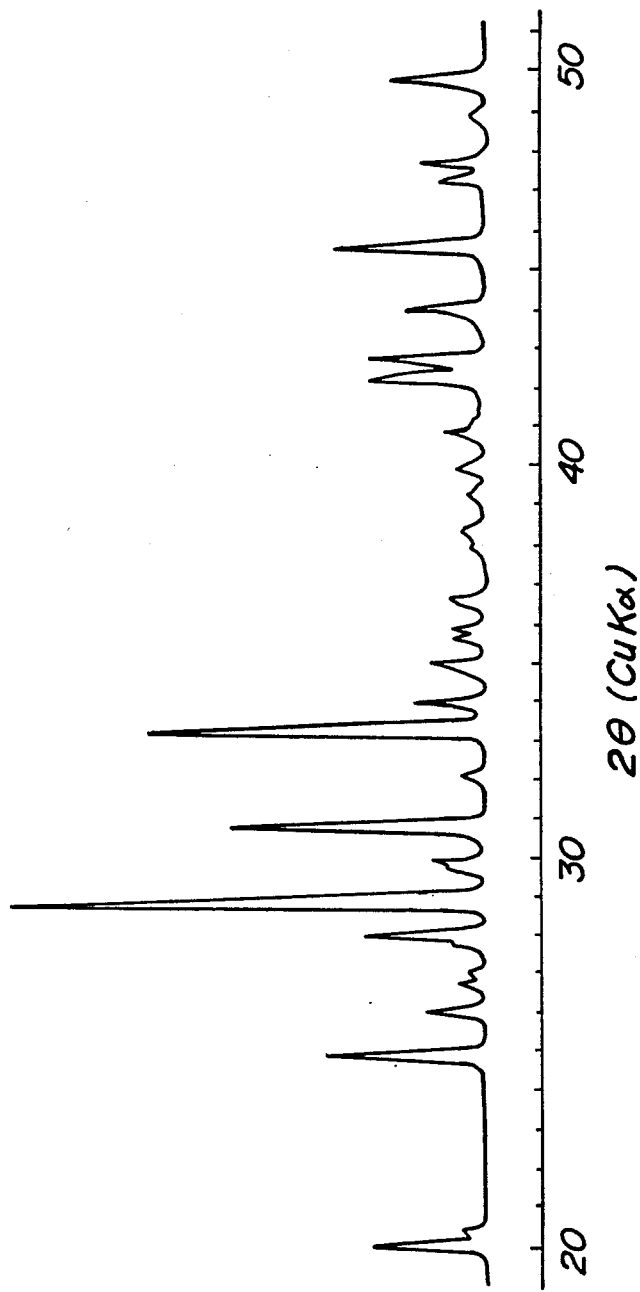

CEMENT ADDITIVE

This invention relates to a cement additive and particularly to a cement additive providing both properties of expansion and strength to a cement by admixing the cement additive to the cement.

Conventional Portland cement has proper ultimate strength and is generally used in the field for setting engineering machines, constructions and molded concrete products, but has a relatively slower hardening property and a lower strength at the early stage of hardening than the other cements, for example aluminous cement. Therefore the application of this cement is limited. Furthermore, conventional Portland cement has a fault that said cement shrinks during the hardening and therefore cracks are formed in concrete constructions.

The progress of the industrial technic in the recent year demands rapid finishing in various workings.

Various proposals have been made with respect to cement expanding agents composed of calcium, alumina and gypsum. For example, an expanding cement composed of alumina cement, gypsum and Portland cement still possesses an insufficient expansion rate. Further, a cement expanding agent consisting mainly of a calcium sulfoaluminate series compound is superior to the above expanding system with respect to its expansion properties. However, since free CaO contained in the calcium sulfoaluminate series expanding agent has a very low resistance to moisture, the expanding agent is weathered and thus the expansivity of the agent decreases considerably.

A cement expanding agent consisting mainly of gypsum possesses strength deficiencies, involves a long aging period, and is still insufficient in the practical use.

The inventors have made investigations in order to obviate these drawbacks and accomplished the present invention.

It is an object of this invention to provide a cement additive which will allow molds to be used three to four times per day instead of once a day in the field of producing molded concrete products.

It is a further object of the present invention to provide a cement additive permitting the rapid working for setting engineering machines and constructions.

Another object of the invention is to provide a cement additive preventing in mortar and concrete which are caused by shrinkage of cement in the hardening and drying.

The present invention consists in a cement additive consisting mainly of a mixture of calcium sulfate and calcium fluoroaluminate having the chemical formula $3CaO \cdot 3Al_2O_3 \cdot CaF_2$. The calcium fluoroaluminate is produced by mixing lime, bauxite and fluorspar in such an amount that the mineral of the resulting product becomes $3CaO \cdot 3Al_2O_3 \cdot CaF_2$ and burning the resulting mixture at a temperature of 1,200°–1,400° C.

If the temperature is lower or higher than the above range and the cooling rate of the resulting clinker is not proper, side reactions occur and therefore the desired results are not obtained.

The above ternary compound $3CaO \cdot 3Al_2O_3 \cdot CaF_2$ is per se known in the art and has been described by J. K. Leary [Nature, 194(482) (1962)79].

The mixing ratio of the above described calcium fluoroaluminate and calcium sulfate is 80–10% by weight of calcium fluoroaluminate and 20–90% by weight of calcium sulfate.

When the resulting mixture is combined with conventional Portland cement in an amount of 1–30% by weight, the set time of the cement may be shortened in a controllable way and the cement will develop a high strength upon setting, and simultaneously the cement composition will develop an effective expansion.

The cements to be used in the present invention include Portland blast furnace cement, fly ash cement and silica cement other than conventional Portland cement.

Furthermore, the cement additive may be used together with a dispersing agent, AE agent, water proofing agent, and the like.

Calcium sulfate in accordance with this invention may be used in the form of dihydrate, hemihydrate and anhydrate.

Since the content of free CaO in the cement additive according to the present invention is very low, the deterioration of properties due to weathering hardly occurs, and the additive is stable. Accordingly, the expansion rate of the cement additive is considerably higher than those of the above described cement expanding agents composed of alumina cement and gypsum or of $12CaO \cdot 7Al_2O_3$ and gypsum. Another merit of the present invention is that the expansion rate of the cement additive can be regulated by varying the mixing ratio of $3CaO \cdot 3Al_2O_3 \cdot CaF_2$ and calcium sulfate. Moreover, when the cement additive having a high content of $3CaO \cdot 3Al_2O_3 \cdot CaF_2$ and a low content of calcium sulfate is mixed with Portland cement, the strength of the Portland cement can be increased considerably. Accordingly, the cement additive of the present invention can be also used as a strength-improving agent of cement. Moreover, when a mixing ratio of the cement additive to cement is increased or the particle size of the cement additive is decreased, a desired strength can be obtained in a short time. Accordingly, the cement additive can be also used as a quick hardening additive. In this case, when calcium hydroxide or sodium carbonate is added to the cement additive as a third component, the rapid hardening time can be more accelerated.

For a better understanding of the present invention, reference is taken to the accompanying drawing, wherein:

The single FIGURE is an X-ray diffraction diagram of the $3CaO \cdot 3Al_2O_3 \cdot CaF_2$ clinker according to the present invention.

The following examples are given for the purpose of illustration of this invention and are not intended as limitations thereof.

EXAMPLE 1

Commercially available calcium carbonate, commercially available alumina and fluorspar were mixed in the following proportions.

|  | % by weight |
| --- | --- |
| Calcium carbonate (purity 99.0%) | 43.8 |
| Alumina (purity 99.5%) | 44.3 |
| Fluorspar (purity 95.0%) | 11.9 |
|  | 100.0 |

The resulting mixture was charged into a platinum crucible and burned at 1,350° C for 2 hours in an electric furnace. The resulting clinker was confirmed from the X-ray analysis curve as shown in the FIGURE that the clinker had a composition of $3CaO \cdot 3Al_2O_3 \cdot CaF_2$. Chemically analytical value according to JIS R5202 is shown in the following Table 1.

Table 1

| Ig-loss | $SiO_2$ | $Fe_2O_3$ | $Al_2O_3$ | CaO | $TiO_2$ | MgO | $CaF_2$ | Total | F-CaO |
|---|---|---|---|---|---|---|---|---|---|
| 0.8% | 7.4% | 3.8% | 45.8% | 30.4% | 0.5% | 0.4% | 10.9% | 99.8% | 0.4% |

The obtained clinker contained 0.4% by weight of free CaO. The clinker was mixed with anhydrous calcium sulfate, which was obtained by burning calcium sulfate dihydrate at 1,000° C for 1 hour, and the resulting mixture was ground to a specific surface area of 2,930 cm²/g to obtain a cement additive. In the above mixing, 25% by weight of the clinker ($3CaO \cdot 3Al_2O_3 \cdot CaF_2$) and 75% by weight of anhydrous calcium sulfate were mixed.

The obtained cement additive and conventional Portland cement were mixed in a weight ratio of 11% : 89% to prepare an enriched cement, and the expansion rate of enriched cement was measured according to JIS A1125. The measuring method is as follows. The enriched cement and sand were mixed in a weight ratio of 1 : 2 to prepare a mortar, and the mortar was mixed at a water/cement ratio of 65%, formed in a metal mold having a dimension of 4 × 4 × 16 cm, cured for one day in a himid air and taken out from the metal mold. The length of the mortar sample was used as a base length. The mortar sample was further cured in water at 20°C for the predetermined period of time as shown in the following Table 2, and the length of the sample was compared with the original length, whereby the expansion rate of the sample was measured. The obtained result is shown in Table 2.

For comparison, the above experiment was repeated, except that $12CaO \cdot 7Al_2O_3$ clinker and $CaO \cdot Al_2O_3$ clinker were used instead of the $3CaO \cdot 3Al_2O_3 \cdot CaF_2$ clinker of the present invention. The obtained results are also shown in Table 2.

Table 2

| Mixing ratio (% by weight) | | Present invention $3CaO \cdot 3Al_2O_3 \cdot CaF_2 : CaSO_4$ 25 : 75 | Conventional additive | |
|---|---|---|---|---|
| | | | $12CaO \cdot 7Al_2O_3 : CaSO_4$ 25 : 75 | $CaO \cdot Al_2O_3 : CaSO_4$ 25 : 75 |
| Expansion rate (%) | 1 day | 0.053 | 0.034 | 0.012 |
| | 3 days | 0.129 | 0.025 | 0.007 |
| | 7 days | 0.247 | 0.022 | 0.013 |
| | 14 days | 0.295 | 0.029 | 0.019 |
| | 28 days | 0.315 | 0.031 | 0.021 |

EXAMPLE 2

A cement additive was produced from the $3CaO \cdot 3Al_2O_3 \cdot CaF_2$ clinker obtained in Example 1 and anhydrous calcium sulfate in the same manner as described in Example 1, except that 33% by weight of the clinker and 67% by weight of the calcium sulfate were mixed and the mixture was ground to a specific surface area of 5,200 cm²/g. The cement additive and conventional Portland cement were mixed in a weight ratio of 7%:93% to prepare a mortar. The result of the strength test of the mortar according to JIS R5201 is shown in the following Table 3 together with the result in the case of mortar of conventional Portland cement alone.

Table 3

| | Bending strength (Kg/cm²) | | | Compressive strength (Kg/cm²) | | |
|---|---|---|---|---|---|---|
| | 3 days | 7 days | 28 days | 3 days | 7 days | 28 days |
| Conventional Portland cement | 30.3 | 49.5 | 79.3 | 121 | 229 | 385 |
| Present invention | 36.7 | 65.7 | 85.6 | 172 | 295 | 402 |

EXAMPLE 3

A cement additive was produced from the $3CaO \cdot 3Al_2O_3 \cdot CaF_2$ clinker obtained in Example 1 and anhydrous calcium sulfate in the same manner as described in Example 1, except that 67% by weight of the clinker and 33% by weight of the calcium sulfate were mixed and the mixture was ground to a specific surface area of 5,200 cm²/g. The cement additive and conventional Portland cement were mixed in a weight ratio of 30%:70% to prepare an enriched cement. A mortar was prepared in the following compounding proportions.

| Enriched cement | 520 g |
|---|---|
| Sand (Toyoura sand) | 1,040 g |
| Water | 234 cc |

The compressive strength of the formed mortar after curing one hour was about 50 Kg/cm² and that after curing 1 day was 190 Kg/cm².

As seen from the above Examples, when the cement additive of the present invention, which is composed of calcium fluoroaluminate represented by the chemical formula $3CaO \cdot 3Al_2O_3 \cdot CaF_2$ and calcium sulfate, is mixed with cement, the expansion rate of the resulting cement composition is about 10 times or more as compared with the case when conventional cement additive is used, and moreover the strength of the cement composition can be increased by about 30% or more. These effects have never been attained by conventional cement additives. Therefore, the present invention is very useful for industry.

What is claimed is:

1. A cement additive comprising calcium sulfate from 20 to 90% by weight and calcium fluoroaluminate having the chemical formula $3CaO \cdot 3Al_2O_3 \cdot CaF_2$ from 80 to 10% by weight.

2. A cement composition comprising cement from 99 to 70% by weight and a cement additive from 1 to 30% by weight, said cement additive comprising calcium sulfate from 20 to 90% by weight and calcium fluoroaluminate having the chemical formula $3CaO \cdot 3Al_2O_3 \cdot CaF_2$ from 80 to 10% by weight.

* * * * *